United States Patent [19]

Samejima et al.

[11] Patent Number: 4,835,549
[45] Date of Patent: May 30, 1989

[54] PRINTING HEAD SYSTEM

[75] Inventors: Kazuhiro Samejima; Masaru Ohnishi, both of Kanagawa, Japan

[73] Assignee: Mitsubishi Denki Kabushiki Kaisha, Tokyo, Japan

[21] Appl. No.: 95,446

[22] Filed: Sep. 11, 1987

[30] Foreign Application Priority Data

Sep. 12, 1986 [JP] Japan .................................. 61-216331

[51] Int. Cl.⁴ ............................................. G01D 15/10
[52] U.S. Cl. ........................ 346/76 PH; 346/107 R; 346/160; 346/154
[58] Field of Search .................... 346/154, 160, 107 R, 346/76 PH; 219/216 PH

[56] References Cited

U.S. PATENT DOCUMENTS 4,455,562 6/1984 Dolan et al. .................. 346/154
4,596,995 6/1986 Yamaka et al. ............... 346/160

FOREIGN PATENT DOCUMENTS

3422907 1/1985 Fed. Rep. of Germany .......... 15/10
2104266 3/1983 United Kingdom .

Primary Examiner—E. A. Goldberg
Assistant Examiner—Huan Tran
Attorney, Agent, or Firm—Bernard, Rothwell & Brown

[57] ABSTRACT

A printing head applicable to a printer widely used as an output device of a facsimile, a computer, or the like having a printing element for generating light or heat to contribute to a printing operation and a driving circuit for supplying the printing element with a controlled energy to drive the printing element. The driving circuit is constituted from a shift register for temporarily storing drive data of the printing element including, for example, a light emitting diode (LED) array to transfer the drive data to the printing element side at a fixed period of time, a storage section including plural memories for storing in advance correction data corresponding to output characteristics of plural printing elements such as LED printing elements, a selection circuit for transmitting a correction instruction output based on the drive data delivered from the shift register and selection data inputted from a selection wiring, and a drive control circuit including, for example, a current or voltage amplifying circuit for supplying the printing element with an appropriate output energy, namely, an output current value or an output voltage value so as to control an output characteristic of each of the individual printing elements based on the three data including the correction data fed via the storage section, image data supplied via an image input line, and an energy output data of, for example, a light emission or a heat radiation delivered from an energy input line. Without using a time factor for controlling the output of the printing element, a control is achieved to attain a uniform output energy from each of the individual printing element constituting the printing element by use of an energy factor such as a current and a voltage, thereby preventing an undesirable printout spot associated with the overall printing element.

11 Claims, 7 Drawing Sheets

PRINTING HEAD SYSTEM

BACKGROUND OF THE INVENTION

1. Field of the Invention

The present invention relates to a printing head for use as an output device of a computer or the like and for use with a facsimile or the like, and in particular, to a driving circuit for driving printing elements of a thermal printer, a light-emitting diode (LED) array head of an LED printer, or the like in which a control is effected to obtain a uniform output energy from the printing elements.

2. Description of the Prior Art

In general, in a thermal printer using a thermal head described above, a variation in the resistance values of heat radiating resistor elements constituting printing elements of a printing head primarily causes an undesirable printing spot; whereas in an LED printer using the LED array head above, a fluctuation in optical outputs from light-emitting elements such as LED's constituting printing elements mainly causes the undesirable printing spot. To overcome such a problem, there have been proposed various ideas to implement a uniform density in characters and images to be printed, thereby attaining a high-quality printout product. For example, the time to supply power to the respective elements and the electric current thus supplied thereto are controlled such that a uniform temperature is developed by the heat radiation of each heat-radiating resistor element in the thermal printer and that a uniform photoenergy is obtained from each light-emitting element in the LED printer.

However, neither of these proposals include a configuration in which a driving circuit to drive the printing elements of the recording head, for example, a driving integrated circuit (to be abbreviated as IC hereinafter) has therein a permanent memory function for correction data. In the conventional technique, therefore, a memory circuit having a large storage capacity and a control circuit to control the memory circuit are required to be disposed at a location external with respect to the printing head including the printing elements and the driving circuit. As a representative example of a printer in which the printing head is driven by means of an external memory and an external control circuit described above, there has been a printer described in the Japanese Patent Laid-Open No. 58-78476 "Method and Apparatus of Controlling Light-Emitting Diode Array" (refer to the U.S. patent application Ser. No. 1981-292985 now U.S. Pat. No. 4,455,562 and the UK patent application GB No. 2 104 266 A entitled as "Control of a Light Emitting Diode Array"). The contents of the application concerning the method and apparatus of controlling the LED array will now be described with reference to FIGS. 1-3.

Figure 1:
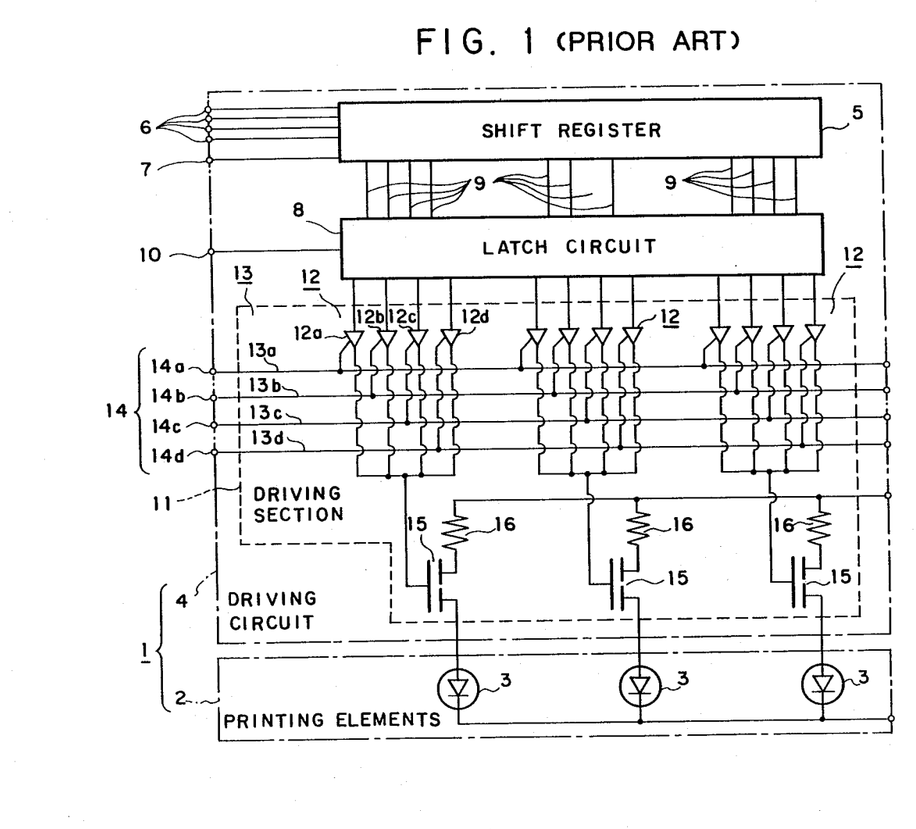
FIG. 1 is a schematic circuit diagram showing the configuration of a driving circuit disposed in a printing head which drives a printing element including, for example, an LED array head and which implements the conventional correction control system.

FIG. 1 is a schematic block diagram illustrating a substantial configuration of a driving circuit in a printing head comprising an LED array, in which the printing head 1 includes a printing elements 2 constituted from an LED array head and the like, the printing element 2 having as individual elements a plurality of LED elements 3 and a driving circuit 4 to drive the printing element 2 by effecting an output control of the printing element 2. The driving circuit 4 comprises a shift register 5 having a plurality of data input terminals 6 and a clock terminal 7 connected thereto by wirings, a latch circuit 8 connected via a plurality of lead wires 9 to the shift register 5 and connected via an internal wiring to a latch clock terminal 10, and a driving section 11 disposed between the latch circuit 8 and the printing element 2 for controlling the quantity of the emitted light of each of the LED elements 3 so as to drive the printing element 2. For each of the LED elements 3, four lead lines 9 (connecting the shift register 5 to the latch circuit 8) having a 1-bit signal transmission capacity are disposed. The driving section 11 comprises tri-state logic (TSL) buffers 12 each including four TSL buffer elements for each LED element 3 corresponding to the lead lines 9, a control bus 13 including lead lines 13a–13d to which the respective TSL buffer elements 12a–12d constituting the TSL buffer 12 are connected and which receives via each of terminals 14a–14d a correction signal having a time width equivalent to a binary value 8, 4, 2, or 1, and output transistors 15 for effecting a switching on/off of outputs from the LED elements 3, the switching operation being executed by use of a load resistor 16 disposed on an anode side when an output from one of the TSL buffers 12 is supplied to a base electrode of one of the output transistors 15. The TSL buffer 12 has four logic gates 12a–12d for each said transistor 15 and each of the logic gates 12a–12d is connected to one of the buses 13a–13d of the common wirings 13 for the switch selection as described above. The TSL buffer 12 is connected to the shift register 5 via the latch circuit 8 and lead lines 9 (for each printing element, four lead lines 9 are disposed). Consequently, the TSL buffer 12 posseses, like the lead lines 9, a 4-bit information transmission associated with the gates 12a–12d.

Next, a brief description will be given of the driving circuit 4 of FIG. 1. The gates 12a–12d of the TSL buffer 12 receive correction signals via through the respective buses 13a–13d of the control bus conductor 13 pulses with time width of binary values 8, 4, 2, and 1, respectively. The binary values each indicate time preset for the buses 13a–13d to gate the TSL buffer 12 respectively. The state of the sequential operation based on the setting value of the time is shown in the timing chart of FIG. 2. Data from the data input terminal 6 is supplied to the register 5 for each clock pulse from the clock terminal 7 until the shift register 5 reaches the full state. In response to the next clock pulse supplied from the clock terminal 7, the data stored in the register 5 is sent to the latch circuit 8 in a bit-parallel fashion. In order to set the driving section 11 to the operable state during the selected cycle, the latch circuit 8 supplies information from the register 5 to the TSL buffer 12 in response to a latch clock signal supplied via the latch clock terminal and the lead wire connecting the latch circuit 8 and the latch clock terminal 10. The TSL buffer 12 supplies a signal from the control bus conductor 13 and a signal from the latch circuit 8 to the output transistor 15 so as to turn on/off the transistor, thereby blinking the LED element 3.

Figure 2:
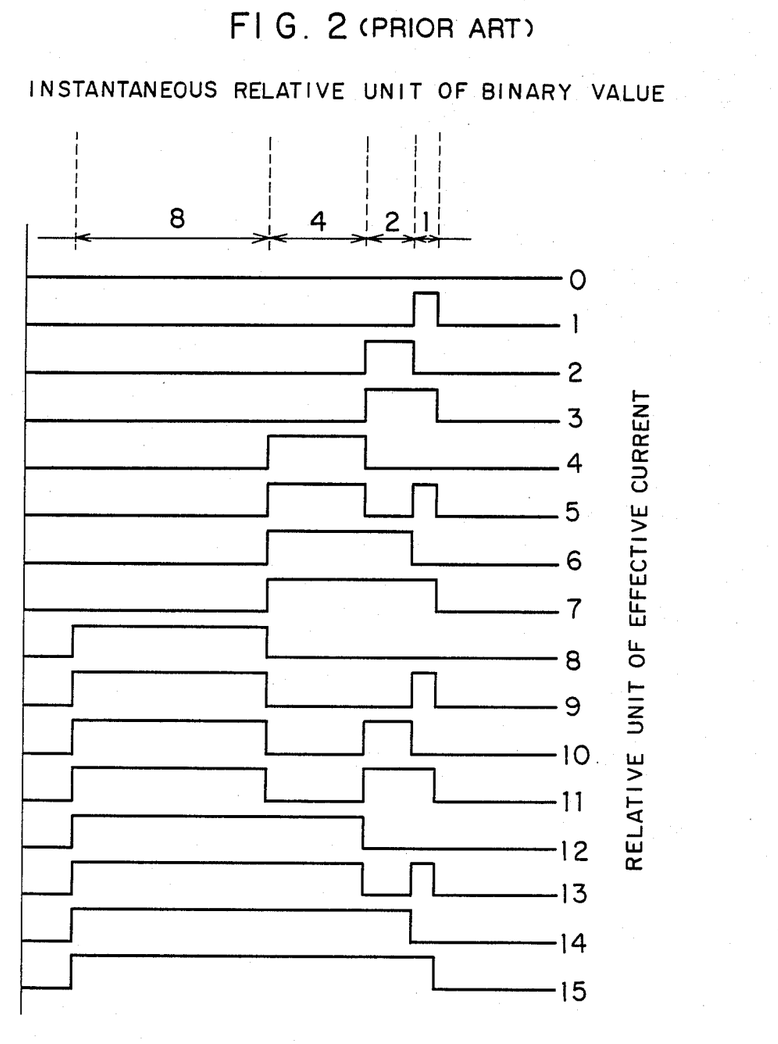
FIG. 2 is a characteristic diagram useful to explain the operation of the conventional driving circuit of FIG. 1.
Figure 3:
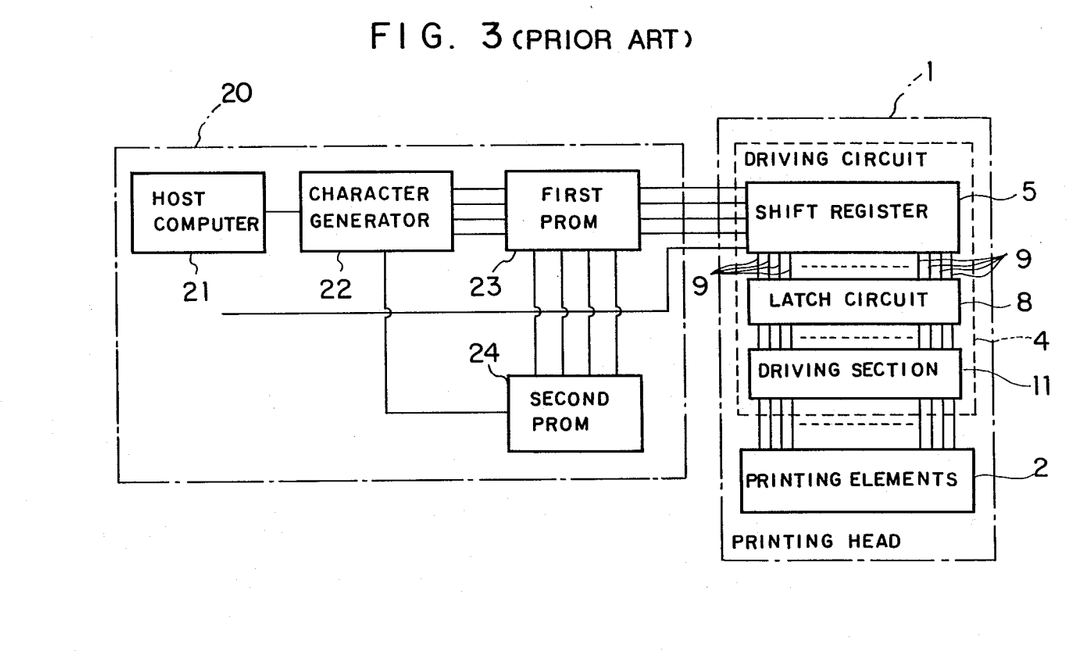
FIG. 3 is a block configuration diagram schematically illustrating a driving system of the driving circuit in which the printing element such as the LED array of FIG. 1 is used and a printing head using the conventional driving circuit is incorporated in an external control device.

Next, the block circuit configuration of FIG. 3 will be described in conjunction with a printer system having the apparatus and the method of controlling the driving circuit described with reference to FIGS. 1–2. The printer system mainly includes two sections, namely, a printing head 1 and a control circuit 20. The printing head 1 is configured in the similar fashion to the printing head described above and hence will not be duplicatedly described. The control circuit 20 separately disposed with respect to the printing head 1 comprises a host computer 21 for transmitting necessary information or commands concerning texts or characters to be reproduced, a character generator 22 for generating a plurality of character signals of a position and a configuration in response to the information from the host computer 21, a first programmable read-only memory (ROM) 23 for supplying the shift register 5 with light emission signals to cause the printing element 2 such as the LED array head to emit light in response to the character signals from the character generator 22, and a second programmable ROM (PROM) 24 for supplying the first PROM 23 with information concerning emission light intensity characteristic of the printing element 2. The character signals generated from the character generator 22 cause the LED elements 3 to emit light according to the respective signals of the plural character signals. The light emission signals thereof are supplied from the first PROM 23 to the shift register 5. The first PROM 23 only outputs load information to the shift register 5 to cause a uniform light emission energy to be generated from each of the LED elements 3, namely, a so-called fixed PROM on which data erase and rewrite operations cannot be effected. The first PROM 23 is connected to the second PROM 24 to be supplied with light emission positional information. The second PROM 24 is a so-called variable PROM in which the data erase and rewrite operations are possible and is programmed so as to supply the first PROM 23 information related to the light emission intensity of the LED array head 3. Incidentally, the driving section 11 includes, as also shown in FIG. 1, the output transistors 15 and load resistors 16 of the output transistors 15.

The LED elements 3 constituting the recording element each possess a unique light emission intensity. However, in a case where the LED elements 3 are incorporated into a mechanism of the printing head for use, each LED element 3 must develop a uniform light emission output energy, which therefore requires correction means. The emission light output energy is represented by a product of a light emission intensity and a light emission time; consequently, if the light emission intensity is detected, the emission light output energy of each LED element 3 can be substantially fixed by controlling the light emission time. In the case of the example above, four data bits are provided to control the light emission intensity so as to construct a matrix together with the control bus conductor 13 commonly wired for the switch selection, thereby establishing 16-stage time intervals for the light emission. Conventionally, such a printer generally includes two sections, namely, a section of a printing head driving IC in which a shift register 5, a latch circuit 8, and a driving section 11 are integrated in a chip and a printing head 1 constituted from a printing element 2 including LED array elements and the like and a section of a control circuit 20 for controlling the printing element 2 via the driving IC 4.

Since the prior-art printer is constituted as described above, there have been problems that the control circuit occupies a great areal ratio in the printer system, which greatly increases the price thereof; moreover, that the head driving IC element integrated in a chip excepting the portion of the printing element 2 including the LED elements 3 is considerably large in size and the price thereof is hence increased. The large size and a high degree of integration of the head driving IC 4 are caused by a fact that in a case where the energy of light emitted from each LED element 3 is corrected through two stages, n shift registers and n latch circuits must be disposed for an LED element 3. Furthermore, since the correction on light emission from the LED head or the like is effected by selecting one of several stages of light emission time, a plurality of lead lines 9 for the respective bits must be used to send signals from the shift registers to the latch circuits, namely, the internal wirings are increased, which causes the IC to be of a large size.

Next, according to a printer to which the printing head above is applied, as the print speed becomes higher, variations in the size and position of each dot in a dot pattern are increased, which leads to a problem that the quality of the printed characters and image is lowered for the following reasons. First of all, as shown in the characteristic diagram of FIG. 2, in a case of a 15-stage correction of the emission light intensity, the period of time required for the driving circuit 4 to effect a correction on the LED element 3 varies in a rang from the minimum unit time to the maximum 15-unit time, namely, the maximum difference is represented by 15 times of the unit time. Particularly, in a printer using an array head in which a plurality of LED elements 3 are incorporated, a photosensitive drum for receiving light to form an image to be printed out is rotating at a constant rotary speed and hence a portion irradiated by the light is continuously moving. Consequently, if the period of time of the light irradiation is varied, the area irradiated by the light is also changed. That is, when the period of time required to scan the entire LED array head is sufficiently small as compared with the scanning period, the error does not become so great to cause a problem; however, in a case of a high-speed printing, the difference of the area irradiated by the light greatly varies and hence the problem cannot be ignored.

SUMMARY OF THE INVENTION

It is therefore an object of the present invention to provide a low-cost printing head easy to handle in which a correction data dedicated memory storing in advance data to correct light emission energy of a printing element is configured to be integral with a driving circuit thereof, thereby minimizing the size of the overall printer system.

Another embodiment of the present invention is to provide an inexpensive printing head and driving IC in which the data to correct light emission energy is directly inputted via a shift register or a latch circuit thereof so as to render unnecessary a shift register dedicated to the correction output, thereby minimizing the size of the printing head.

Still another embodiment of the present invention is to provide a printing head in which correction of the undesirable print dot such as a variation in size and gradation of printed dots does not require the control of the driving time to drive the photosensitive or heat sensitive drum or the like, namely, the amount of correction is controlled depending on a current or a voltage; in other words, the driving control of the printing element is not effected by a time factor but by an energy factor so as to keep the size and position of each dot to be fixed in a printing dot pattern, thereby attaining a high quality of the printed characters and images regardless of the print speed.

In order to achieve the objects above, according to the present invention, there is provided a printing head constituted from a printing element such as an LED array head and a thermal head and a driving circuit to drive the printing head wherein the driving circuit comprises a shift register for receiving from an external control device a driving signal to drive the printing element so as to transfer or temporarily store the driving signal, store means including a plurality of store sections for storing image information and information form a plurality of stages of corrections, select means for selecting as correction signals the correction information of the plurality of store sections depending of an amount of correction of an output from the printing element, and printing element drive control means connected to the store means and the select means for additionally effecting a setting and a control on the amount of correction of the output from the printing element through a correction of a current or a correction of a voltage based on the correction signals selected by the select means.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Preferred embodiments of the printing head according to the present invention will now be described in detail with reference to the accompanying drawings.

Figure 4:
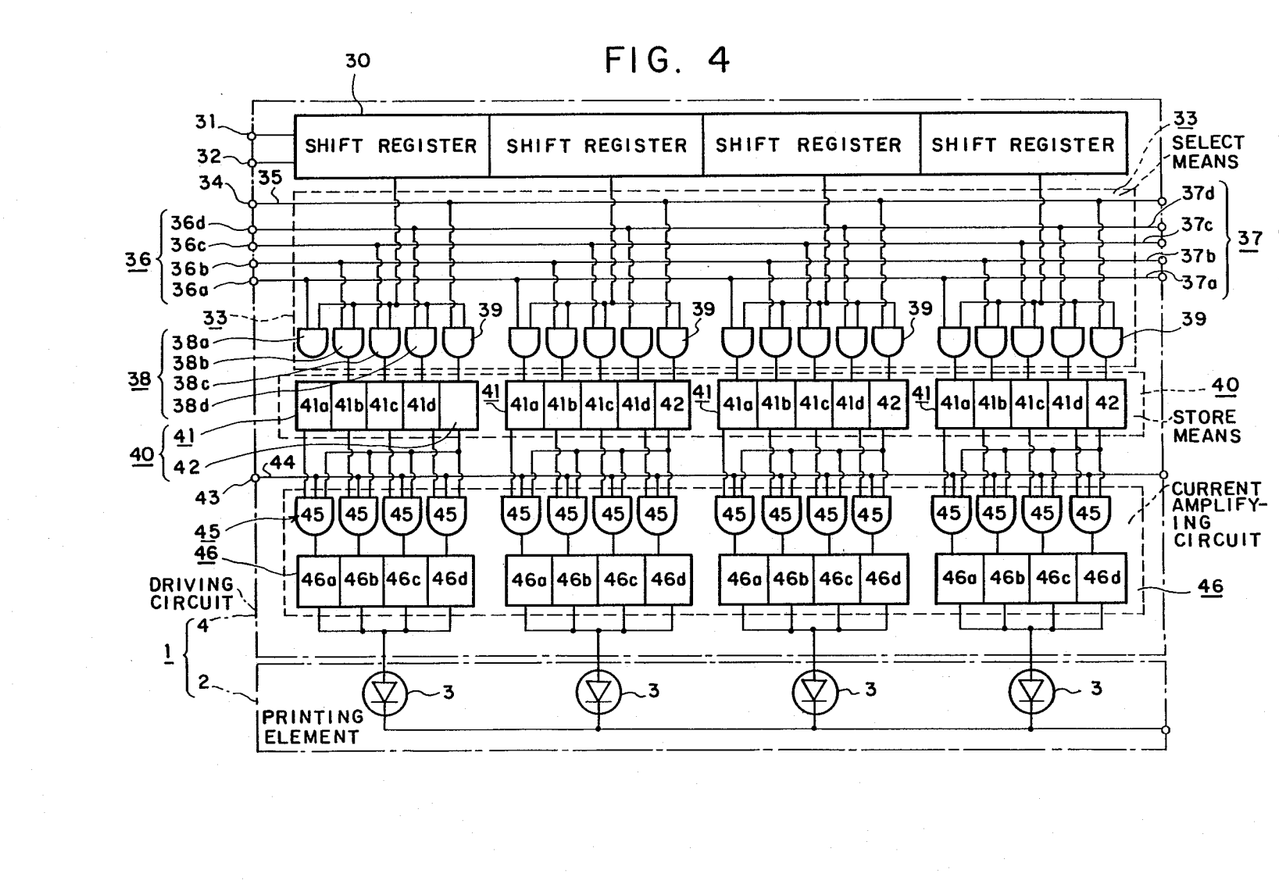
FIG. 4 is a schematic circuit diagram useful to explain a first embodiment of the printing head according to the present invention depicting the substantial configuration of a driving circuit in which an LED array is used as a printing element and a current amplifying circuit is employed as means to drive the LED array.
Figure 5:
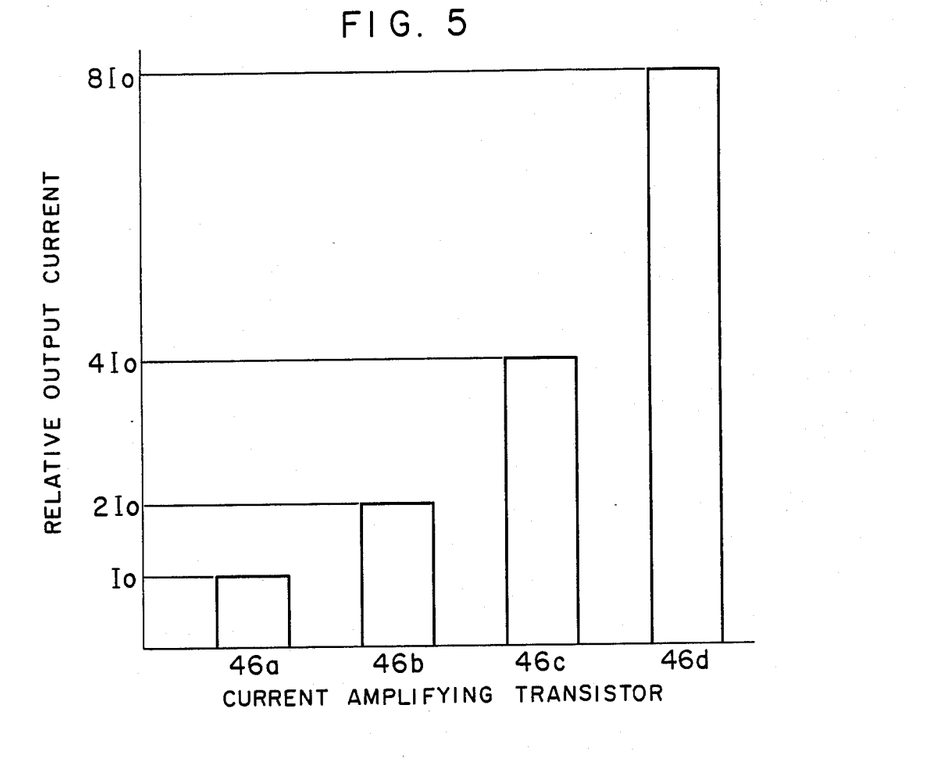
FIG. 5 is a characteristic diagram showing the relative output voltage from a current amplifying transistor of the driving circuit disposed in the printing head of the first embodiment of FIG. 4.
Figure 6:
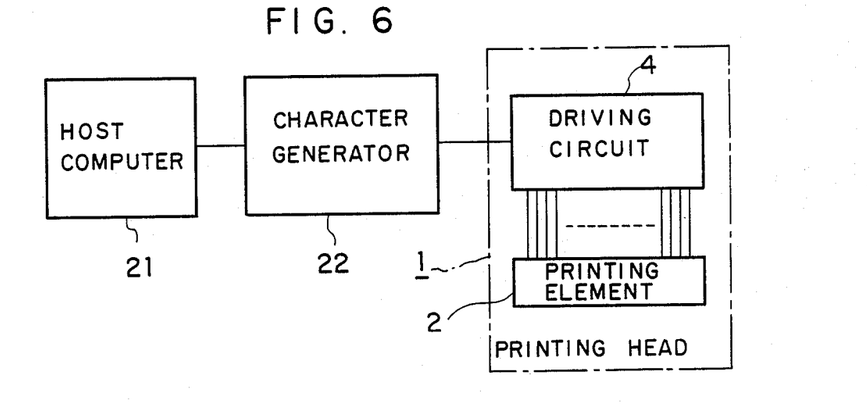
FIG. 6 is a driving system construction diagram schematically illustrating a printer using the printing head of the first embodiment.

FIGS. 4-6 include a circuit diagram of the primary section, a characteristic diagram, and a driving system configuration diagram of a first embodiment according to the present invention. The components assigned with the same reference numerals as those of FIGS. 1 and 3 respectively indicate the same or equivalent sections. In this embodiment, an LED array is used as a printing element and a current amplifying circuit is employed as means of the driving circuit to control the operation to drive the printing element. In FIG. 4, a printing head 1 to which a current-type driving system according to the present embodiment is applied substantially includes a printing element 2 constituted from a plurality of LED elements 3 like an LED array as a discrete element and a driving circuit 4 to drive the printing element. The driving circuit 4 comprises a shift register 30 which temporarily stores driving data supplied from a data input terminal 31 which sequentially transfers the driving data according to a fixed time constant based on a shift clock pulse delivered from a shift clock terminal 32; select means 33 connected to said shift register 30 including an image data input line 35 connected to an image data input terminal 34, a plurality of selection data input lines 37 connected to a plurality of selection data input terminals 36, an AND gate 38 for logically multiplying the driving data and the selection data, and an AND gate 39 for logically multiplying the driving data and the image data; store means 40 having a plurality of correction data memories 41 storing in advance correction data to be delivered depending on an instruction input from the AND gate 38 and an image data memory 42 temporarily storing an output from the AND gate 39; an emission light data input line 44 connected to an input terminal 43 for inputting emission light data as strobe signals in the form of light emission feedback signals for receiving the emission light data from an external control device (not shown); an AND gate 45 for logically multiplying data respectively inputted through the correction data memory 41, the image data memory 42, and the emission light data input line 44; and a current amplifying circuit 46 as drive control means, for example, including a transistor to amplify a current depending on an amount of correction beforehand stored in the correction data memory 41. In this embodiment, since four correction values are prescribed to be used as current values for the correction, the selection data input line 37 has four input lines 37a–37d, the AND gate 38 includes four AND gates 38a–38d, the correction data memory 41 comprises memories 41a–41d respectively storing different correction values, and the current amplifying circuit 46 includes a plurality of current amplifying transistors 46a–46d.

The current amplifying transistors 46a–46d are disposed for each correction output and are connected in parallel and the outputs therefrom are supplied to the LED element 3 so as to control the light emitting state of the printing element 2 including a plurality of LED elements 3. The light emission intensity varies among the printing elements 3 of the LED element 2 as described in conjunction with the conventional printing head. In addition, the light emission output of the LED element 3 varies depending on the respective driving current, namely, as the pertinent current value increases, the light emission output becomes greater. In this embodiment, since the printing element 2 is configured by arranging a plurality of LED elements 3 in the longitudinal direction thereof, the light emission output of the overall printing element 2 can be retained at a constant level by controlling the light emission output of the individual LED elements 3. In the first embodiment above, the current amplifying transistors 46a–46d are set to respectively develop the different current values, for example, the output current values in the binary notation as shown in FIG. 5. As a consequence, the current value outputted from the respective current amplifying circuit 46 to each LED element 3 is controlled according to the correction data stored in the shift register 30 in the 15 stages associated with units of stage 1 to stage 15 as described in conjunction with FIG. 2.

The printing head according to the first embodiment includes the printing element 2 having several thousand LED elements 3 arranged in a row and the driving circuit 4 disposed adjacent to and connected to the printing element 2. Consequently, the entire driving system of the printing head can be simply constituted as shown in FIG. 6. In this diagram, a printer in which the printing head of the first embodiment is incorporated substantially includes a host computer 21 for general purposes or for a dedicated use, a character generator 22 for receiving information or commands concerning characters or texts to be printed, and a printing head 1 having the printing element 2 and the driving circuit 4. The character generator 22 determines a correction amount of the LED element and a position and a constitution of a character outputted from the host computer 21 and transmits these information signals to the printing head 1 as driving data.

Referring next to FIGS. 4-6, the operation of the printing head 1 will be described. First, driving data supplied from the character generator 22 via the data input terminal 31 is temporarily stored in the shift register 30. On the other hand, the respective light emission intensity of each LED element 3 is measured in advance in consideration of the position where the LED element 3 is installed, the relation with respect to the connection, and the change of time aging and correction data associated with these characteristics is stored in the correction data memory 41 in the store means 40 of the driving circuit 4 so as to be permanently retained therein. The driving data temporarily stored in the shift register 30 is transferred for each group of information based on the period of the latch clock pulse so as to be transferred to the select means 33. In the select means 33, the selection data supplied from the selection data input terminal 36 is logically multiplied with the drive data delivered from the shift register 30 by means of the respective AND gates 38 so as to determine the amount of correction to be applied to a case where the current value of each LED element 3 is corrected depending on the drive data. When the amount of correction is determined, the output is then supplied to the AND gate 45 so as to be logically multiplied, according to the emission light data as an output energy data supplied from the emission light data input terminal 43, with the logical product between the image data supplied from the image data input line 35 and the drive data, thereby computing the respective correction current values, which are then outputted as correction instructions to the current amplifying transistors 46a–46d of the current amplifying circuit 46. The current amplifying transistors 46a–46d deliver the predetermined current values to the respective LED elements 3 based on the instruction values from the AND gate 45 and hence are not disturbed by an influence from the position, connection state, etc. of the LED elements 3, thereby achieving a print operation with an appropriate amount of light emission. As described above, the intensity of the light emission output of the overall printing element 2 becomes to be substantially even and uniform.

Figure 7A:
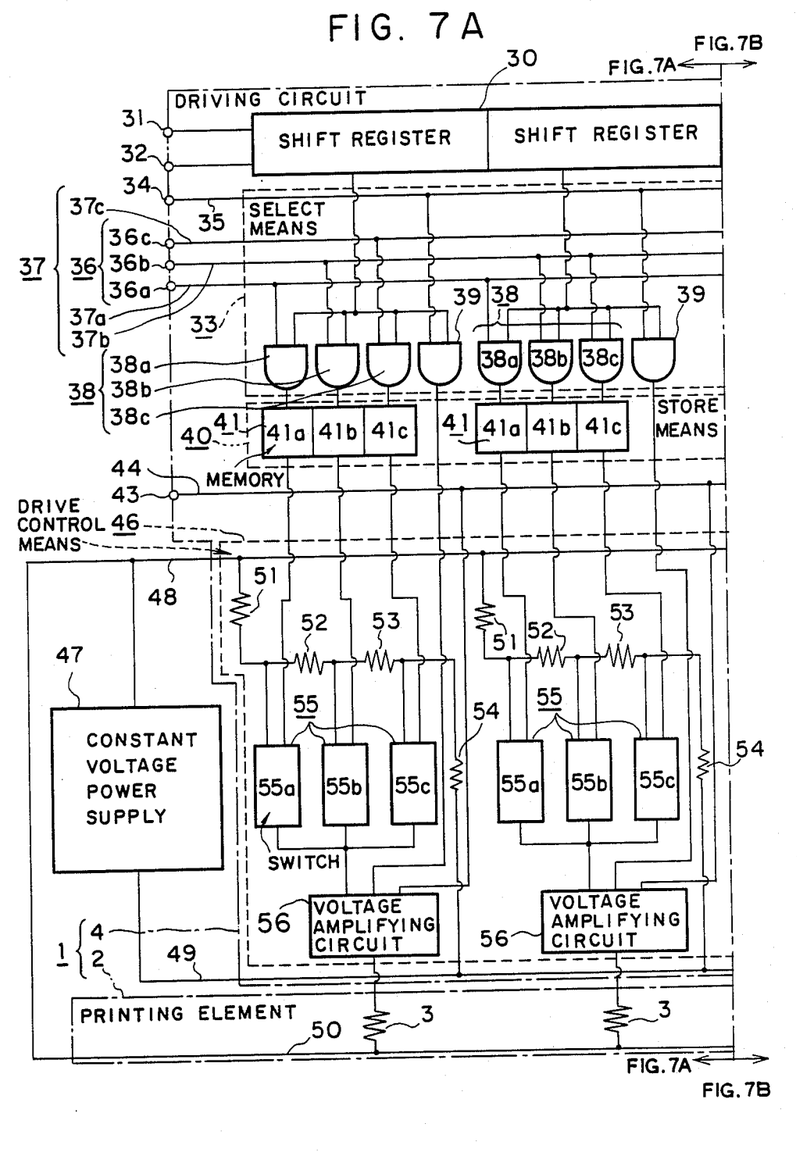
FIG. 7 is a circuit diagram useful to explain a second embodiment of the printing head according to the present invention schematically illustrating a driving circuit using as the printing element a heat sensitive element such as a thermal head and employing a voltage amplifying circuit as drive control means to control the heat sensitive element.
Figure 7B:
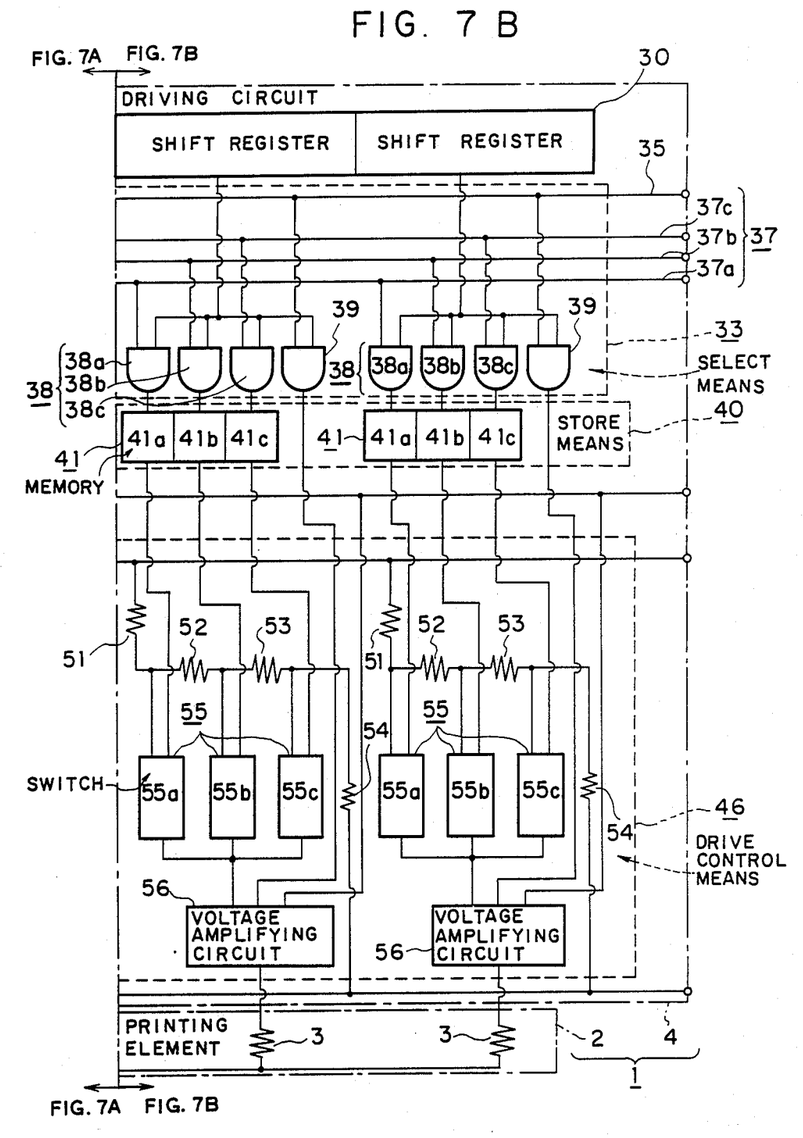

In the description of the first embodiment above, although the printing element is configured with a plurality of LED elements 3 constituted in a unit like an LED array or the like, and the LED array or the like is controlled by use of drive control means which corrects a current value based on the drive data, selection data, correction data, and light emission data, the present invention is not restricted by this embodiment, namely, as shown in FIG. 7, a heat sensitive element such as a thermal head may be employed as the printing element so as to control the output from the heat sensitive element by use of a voltage value. In the driving circuit of the voltage control type of FIG. 7, the components assigned with the same reference numerals as those of FIGS. 1 and 4 are assumed to indicate the same or equivalent sections. In this diagram, a printing head 1 includes printing element 2 comprising heating elements 3 like a thermal head and a driving circuit 4 effecting a drive control to obtain a uniform heat radiation output from the printing element 2. The driving circuit 4 includes a shift register 30 for temporarily storing drive data supplied from a drive data input terminal 31 and for transferring the drive data to the side of the printing element 2 in response to a predetermined latch clock pulse; select means for selecting a desired amount of correction based on the correction data; store means 40 having a correction data memory 41 storing predetermined correction data used to determine a correction output of the printing element 2 based on the correction amount selected by the select means 33; and drive control means 46 for setting an amount of correction for a voltage to be supplied to each heating element 3 of the printing element 2 based on the correction output from each memory 41 of the store means 40, thereby controlling the operation to drive the printing element 2. The select means 33 comprises a select wiring 37 including a plurality of lead lines 37a–37c supplying a plurality of selection data fed via a selection data input terminal 36 having a plurality of terminals 36a–36c, an AND gate 38 including respective gates 38a–38c for logically multiplying the selection data from the selection line 37 and the drive data from the shift register 30, and an AND gate 39 for logically multiplying the drive data and the image data supplied from the input terminal 34. The drive control means 46 comprises voltage dividing resistors 51–54 in a series connection connected in parallel between power bus conductors 48–49 drawn in the drive circuit 4 from a constant voltage power supply circuit 47 disposed for the drive circuit 4, a voltage switch circuit 55 including respective switches 55a, 55b, and 55c respectively connected to the series connecting points of the voltage dividing resistors 51–54 and further supplied with the respective outputs from the memories 41a, 41b, and 41c of the store means 40, and a voltage amplifying circuit 56 for receiving change-over outputs delivered from the switches 55a, 55b, and 55c of the voltage switch circuit 55, the logical product output supplied from the AND gate 39, and the heat radiation data supplied from the heat radiation data input terminal 43 so as to amplify the voltage value based on an amount of correction determined by means of the switch circuits 55a–55c. Incidentally, the heating elements 3 are respectively connected in parallel to the power bus conductor 50 connected to the constant voltage power supply circuit 47 in parallel.

Next, a description will be given of the operation of the printing head in the configuration above. First, the constant voltage power supply circuit 47 delivers a driving or heating voltage to each heating element 3 through the power bus conductor 50. The voltage value is generated to be a predetermined voltage value corresponding to the state of each heating element 3 based on a desired correction voltage value set by the voltage amplifying circuit 56. The store means 40 produces a logical product between the drive data transferred from the shift register 30 and the selection data supplied via the selection wiring 36 so as to set a predetermined amount of correction. When the correction amount is determined, correction outputs are sent to the data memories 41a–41c of the store means 40 storing the correction data in advance. Based on the correction instruction outputs, the respective memories 41a–41c transmit predetermined voltage setting values beforehand stored to the respective switch circuits 55a–55c. In the voltage switch circuit 55, the switches 55a–55c respectively receive the correction data and voltages developed at the connecting points of the voltage dividing resistors 51–54, thereby delivering a correction output to the voltage amplifying circuit 56 based on the received data. The voltage amplifying circuit 56 receives the correction output, the image data from the AND gate 39, and the heat radiation data fed from the heat radiation data input terminal 43 so as to supply an appropriate driving voltage to each heating element 3.

As described above, according to the second embodiment of the present invention, the printing element drive circuit of the voltage drive type for the printing head enables to attain a high-quality printed matter without the gradation dot by measuring in advance the heating temperature of each heating element and by storing a correction data to retain the heating temperature at a fixed level.

In the description of the second embodiment above, although the correction voltage values are set to the correction data beforehand stored in the respective memories 41a–41c of the store means 40 and the voltage switch circuit 55 includes three switch circuits 55a–55c, the present invention is not restricted by this embodiment, namely, the voltage switch circuit may be configured in a simple form of a two-stages switch circuit; alternatively, a 4-stages, 5-stages, or 6-stages configuration or a configuration with more stages, for example, of about 15 stages may be employed to enable a fine-step control, thereby implementing a precise adjustment.

Furthermore, in the second embodiment above, the correction control of the voltage type has been described to be applied to a system of a thermal printer, such a drive control means using, for example, a voltage amplifying circuit may be applied to a printer other than those including a thermal head.

As described above, according to the printing head of the present invention, memory means storing the respective correction data of a plurality of light emitting elements or a plurality of resistor elements constituting the recording element of the printing head is disposed in a driving circuit of the printing head, an amount of correction depending on the printing state of the printing element is selected by and outputted from selection means, and drive control means amplifies and outputs a driving current or a driving voltage for the printing element based on the correction data thus outputted; consequently, neither control means nor processing means need be disposed to process the correction data for the output correction; furthermore, a low-cost printing head having a simple circuit configuration ca be obtained.

In addition, a driving circuit including store means can also be implemented in a 1-chip IC; moreover, if desired, the driving circuit may be configured in a module together with a printing element so as to ensure the drive control of the printing element, which enables to provide a highly operable printing head easy to handle.

Furthermore, since the store means for the drive data is separately disposed with respect to the store means for the correction data and hence the respective processing means are employed for the respective data processing, a separate processing time need not be used for the respective data processing and the drive control can be achieved at the same time during a predetermined period of time, thereby providing a printing head which enables to minimize the processing time and which generates a high-quality printed matter.

While the present invention has been described with reference to the particular illustrative embodiments, it is not restricted by those embodiments but only by the appended claims. It is to be appreciated that those skilled in the art can change and modify the embodiments without departing from the scope and spirit of the invention.

What is claimed is:

1. A printing head including a printing element for generating light or heat to contribute to a printing operation and a driving circuitry for supplying said printing element with a controlled energy so as to drive said printing element wherein said driving circuit comprises:
   shift register means for temporarily storing drive data for said printing element and for transferring the drive data to a side of said printing element at a fixed period of time;
   store means including a plurality of individual memories for respectively storing in advance correction data corresponding to an output characteristic of each of a plurality of individual elements constituting said printing element;
   select means including a selection circuit for transmitting a correction instruction output based on drive data transferred from said shift register means and selection data and a selection wiring for supplying said selection data to said selection circuit, thereby selecting fixed data from the correction data stored in said store means; and
   drive control means or transmitting an appropriate output energy to said printing element based on three data including the correction data supplied via said store means, image data delivered via an image input line, and energy output data fed via an energy input line so as to control an operation to drive said individual elements according to a correction amount of energy corresponding to an output characteristic of each said individual element.

2. A printing head according to claim 1 wherein each said individual memory of said store means is configured such that in order to enable said individual element constituting said store element to output a substantially fixed energy, each said each individual element includes a nonvolatile memory for beforehand storing said correction data to which the correction amount is to be set.

3. A printing head according to claim 1 wherein each said individual memory of said store means is configured such that in order to enable said individual element constituting said store element to output a substantially fixed energy, each said individual element includes a nonvolatile memory for beforehand storing said correction data to which the correction amount is to be set and further comprising memory means, in order to send output data based on the drive data transferred from said shift register means and the image data fed from the image data input line, for temporarily storing therein said output data.

4. A printing head according to claim 1 wherein said selecting circuit constituting said select means includes AND gate means for logically multiplying the selection data from said selection wiring and the drive data transferred from said shift register means.

5. A printing head according to claim 1 wherein said printing element includes a light-emitting diode (LED) array having a plurality of LEDs as the individual elements to be caused to emit light in response to light emission data in a form of said energy output data and said drive control means includes a current amplifying circuit for amplifying an output current to each said LED to an appropriate current value so as to individually effect a drive control on each said LED based on three data including the correction data sent from said store means, the drive data supplied via said shift register means, said select means, and a temporary storage memory constituting said store means, and the light emission data.

6. A printing head according to claim 5 wherein said current amplifying circuit comprises:

AND gates for logically multiplying three data including the correction data, the drive data, and the light emission data in a form of said energy output data, said AND gates being disposed as many as there are correction data memories included in said store means as many as there are different correction data; and a current amplifying transistor for outputting a drive current associated with an appropriate correction amount for said each LED disposed as said individual element.

7. A printing head according to claim 1 wherein said printing element includes a thermal head array configured by arranging a plurality of resistive heating elements as said individual element to be caused to radiate heat based on heat radiation data in a form of the energy output data; and said drive control means includes a voltage amplifying circuit for amplifying an output voltage to each said heating element to an appropriate voltage value so as to individually effect a drive control on each said heating element based on three data including the correction data sent from said store means, the drive data supplied via said shift register means, said select means, and a temporary storage memory constituting said store means, and the heat radiation data.

8. A printing head according to claim 7 wherein said voltage amplifying circuit comprises:

a constant voltage power supply circuit for supplying each of said heat radiating elements with a constant voltage;

a voltage-dividing series-resistor circuit connected in parallel to a power supply conductor connected to said constant voltage power supply circuit, said voltage-dividing series-resistor circuit including a plurality of resistive elements connected in series;

a plurality of voltage switch circuits for changing over a drive voltage of each said heat radiating element to a most appropriate correction voltage value data based on a voltage division data from each of connecting points of said voltage-dividing resistive elements constituting said voltage-dividing series-resistor circuit and the correction data previously stored in said store means; and a voltage amplifier for receiving three data including the correction voltage value data, the drive data, and the heat radiating data so as to output a drive voltage of a most appropriate correction amount to each said heat radiating resistive element based on the correction voltage value determined by said select means and said voltage switch circuits.

9. A printing head according to claim 8 wherein said voltage amplifying circuit comprises a voltage-driven transistor for amplifying an output voltage delivered from said constant voltage power supply circuit to each said heat radiating element to a most appropriate voltage value so as to control a heat radiation state of said printing element based on three data input signals including the correction voltage value data, the drive data, and the heat radiation data.

10. A printing head according to claim 1 wherein said drive circuit including said shift register means, said store means, said select means, and said drive control means is configured in a one-chip integrated circuit (IC).

11. A printing head according to claim 1 wherein said drive circuit including said shift register means, said store means, said select means, and said drive control means is configured in a one-chip driving integrated circuit (IC); and said driving IC and said printing element being integrally arranged in a substrate.

* * * * *

UNITED STATES PATENT AND TRADEMARK OFFICE
CERTIFICATE OF CORRECTION

PATENT NO. : 4,835,549

DATED : May 30, 1989

INVENTOR(S) : Kazuhiro Samejima and Masaru Ohnishi

It is certified that error appears in the above-identified patent and that said Letters Patent is hereby corrected as shown below:

Column 2, line 36, delete the word "through";

line 37, after "conductor 13" insert the word --through--.

Column 9, line 67, "ca" should be --can--.

Signed and Sealed this

Thirty-first Day of July, 1990

Attest:

HARRY F. MANBECK, JR.

Attesting Officer

Commissioner of Patents and Trademarks